US012209792B2

(12) United States Patent
Berry et al.

(10) Patent No.: US 12,209,792 B2
(45) **Date of Patent: *Jan. 28, 2025**

(54) DEFROSTING ROLL-UP CLIMATE CONTROLLED DOOR

(71) Applicant: Jamison Door Company, Hagerstown, MD (US)

(72) Inventors: Curtis Berry, Williamsport, MD (US); Pete Smith, Lewistown, MT (US); Dan Rhyner, Lewistown, MT (US)

(73) Assignee: Jamison Door Company, Hagerstown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,790

(22) Filed: Mar. 1, 2024

(65) Prior Publication Data

US 2024/0255209 A1 Aug. 1, 2024

Related U.S. Application Data

(63) Continuation of application No. 16/998,041, filed on Aug. 20, 2020, now Pat. No. 11,920,854.

(60) Provisional application No. 62/889,718, filed on Aug. 21, 2019.

(51) Int. Cl.

| | |
|---|---|
| ***F25D 23/02*** | (2006.01) |
| ***E06B 9/58*** | (2006.01) |
| ***E06B 9/70*** | (2006.01) |
| ***F25D 21/04*** | (2006.01) |
| *F24F 12/00* | (2006.01) |

(Continued)

(52) U.S. Cl.

CPC .............. *F25D 23/021* (2013.01); *E06B 9/58* (2013.01); *E06B 9/70* (2013.01); *F25D 21/04* (2013.01); *E06B 2009/586* (2013.01); *F24F 12/00* (2013.01); *F24F 2013/221* (2013.01); *F24H 3/02* (2013.01)

(58) Field of Classification Search

None

See application file for complete search history.

(56) References Cited

U.S. PATENT DOCUMENTS

| | | | | |
|---|---|---|---|---|
| 5,544,690 A * | 8/1996 | Magro | ...................... | E06B 9/68 160/133 |
| 2004/0192187 A1* | 9/2004 | Ashley | .................. | F25D 23/023 454/191 |

(Continued)

*Primary Examiner* — Ko-Wei Lin

(74) *Attorney, Agent, or Firm* — Frost Brown Todd LLP

(57) ABSTRACT

A roll-up door assembly includes a first curtain, a second curtain, and a side frame. The first curtain and the second curtain can transition between a lowered position and a raised position. The first curtain and the second curtain at least partially define an internal volume in the lowered position. The side frame includes an elongated body defining a hollow interior, a pair of curtain tracks, a heating assembly, and an inlet assembly. The pair of curtain tracks can guide the first curtain and the second curtain between the lowered position and the raised position. The heating assembly can circulate heated air into the internal volume. The inlet assembly can provide fluid commination between the heating assembly and a lower temperature conditioned space such that the heating assembly can circulate air from the lower temperature conditioned space into the internal volume.

20 Claims, 13 Drawing Sheets

(51) Int. Cl.
*F24F 13/22* (2006.01)
*F24H 3/02* (2022.01)

(56) References Cited

U.S. PATENT DOCUMENTS

| | | | | |
|---|---|---|---|---|
| 2006/0199497 | A1* | 9/2006 | Smith ........................ | F24F 9/00 454/173 |
| 2018/0112458 | A1* | 4/2018 | Iglesias Ballester ..... | E06B 9/13 |

* cited by examiner

DEFROSTING ROLL-UP CLIMATE CONTROLLED DOOR

PRIORITY

This application is a continuation of U.S. patent application Ser. No. 16/998,04, entitled "Defrosting Roll-Up Climate Controlled Door," filed on Aug. 20, 2020; which claims priority to U.S. Provisional Patent Application No. 62/889,718, entitled "Defrosting Roll-Up Climate Controlled Door," filed on Aug. 21, 2019, the disclosure of which is incorporated by reference herein.

BACKGROUND

A roll-up door assembly may transition between a closed position to an open position through use of a rotatable drum and a flexible curtain. In particular, the rotatable drum may wrap and unwrap the flexible curtain around the circumference of the drum to transition between the open and closed positions, respectively. Because roll-up door assemblies open and close with a flexible curtain wrapping around a drum, significant space may be saved installing a roll-up door assembly as compared to a standard door lacking ability to wrap around the entire circumference of a drum.

In some instances, a roll-up door assembly may be installed between rooms having differing temperatures. As one example, a roll-up door assembly may be installed between a first room that is climate-controlled, and a second room that is not climate-controlled. As another example, a roll-up door assembly may be installed between two climate-controlled rooms having different temperatures, such as a walk-in freezer and a traditionally air-conditioned room. In such instances, unwanted condensation may develop on the surface of the flexible curtain facing toward the warmer room (i.e., "the warm side" of the curtain), which may cause unwanted damage to various structures of a roll-up door assembly, or may cause moisture to run off the curtain to the floor creating a safety hazard and/or accumulate bacteria on the floor or the curtain. Condensation may develop on the warm side of a flexible curtain when the surface temperature of the curtain facing the warm side drops below the dew-point of the warm side air.

In order to prevent unwanted condensation buildup, some roll-up door assemblies blow heated air on the warm side of the flexible curtain to encourage evaporation of accumulated moisture and raise the surface temperature of the warm side of the flexible curtain above the dew point of the warmer room (thereby preventing accumulation of moisture on the warm side). The air, which may be heated depending on the temperature difference between the air on both sides of the door, is usually blown from the top of the roll-up door assembly toward the floor. Additionally, or alternatively, infra-red heaters may be used on the warm side of the curtain to simply heat the warm side of the curtain above the dew point of the warm side air. These means of preventing unwanted condensation buildup may require significant amounts of energy since the heat source and heated air are not contained and the heated air ends up dissipating into the open area of the warmer room. In some instances, the heated air has to be taken out by the refrigeration systems, which adds more cost.

While a variety of door assemblies have been made and used, it is believed that no one prior to the inventor(s) has made or used a door assembly as described below.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

DETAILED DESCRIPTION

Figure 1:
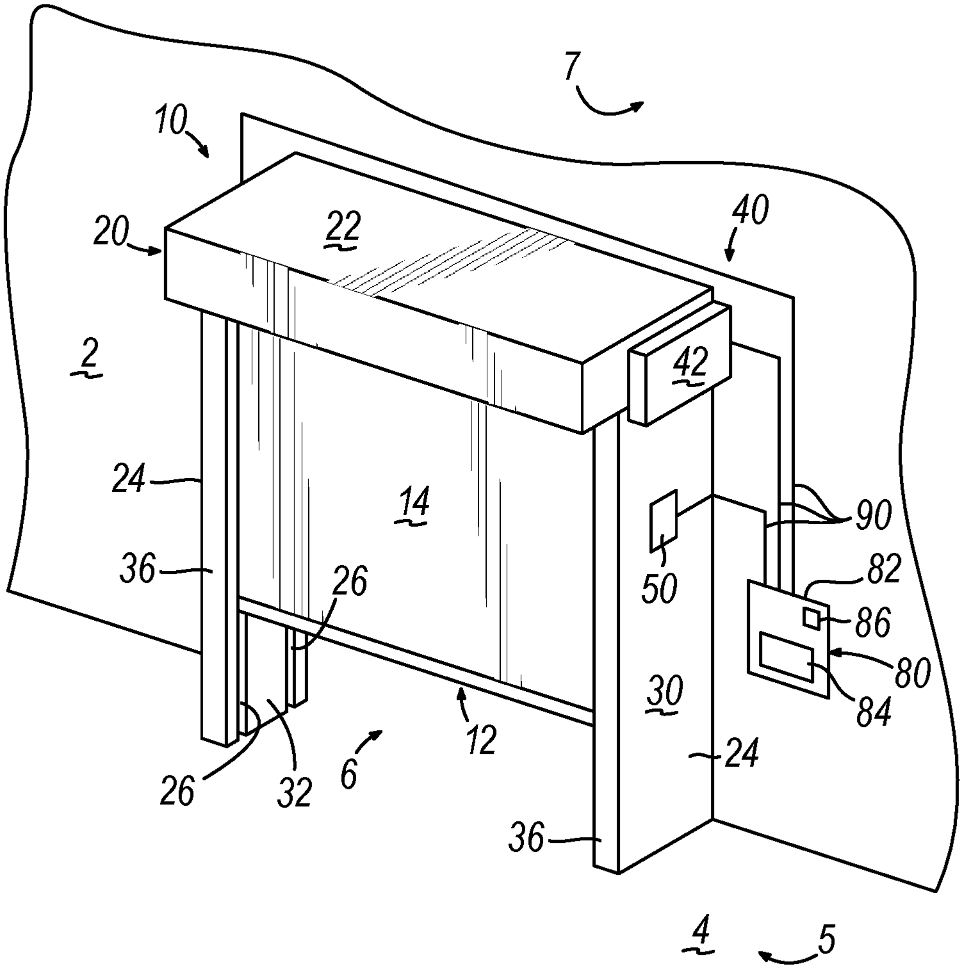
FIG. 1 depicts a perspective view of an exemplary dual curtain roll-up door assembly.

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Dual Curtain Roll-Up Door Assembly

As mentioned above, when a roll-up door assembly is placed between rooms of differing temperatures, heating the warm side of a flexible curtain to raise its surface temperature above the dew point of the warmer room may require significant amounts of energy due to dissipating thermal energy into the warmer room. Therefore, it may be desirable to at least partially contain the generated thermal energy intended to raise the temperature of the warm side of a flexible curtain in order to reduce unwanted dissipation of such thermal energy into the warmer room.

FIGS. 1-3B show an exemplary dual curtain roll-up door assembly (10) installed on a wall (2) that partitions a warmer room (5) and a cooler room (7). Warmer room (5) and cooler room (7) may have differing temperatures, such that cooler room (7) is climate controlled at a temperature lower than warmer room (5). Due to the lower temperature and climate-controlled nature of cooler room (7), the mass of water vapor per pound of dry air in the cooler room (7) will likely be lower than it is in the warmer room (5); therefore, the air in cooler room (7) will likely have a much lower dew point compared to the air in warmer room (5) because the temperature is lower and the air has been conditioned by a refrigeration unit.

Dual curtain roll-up door assembly (10) includes a dual curtain assembly (12), a frame assembly (20), an actuation assembly (40), an internal volume heating assembly (50), and a control panel (80).

Figure 2A:
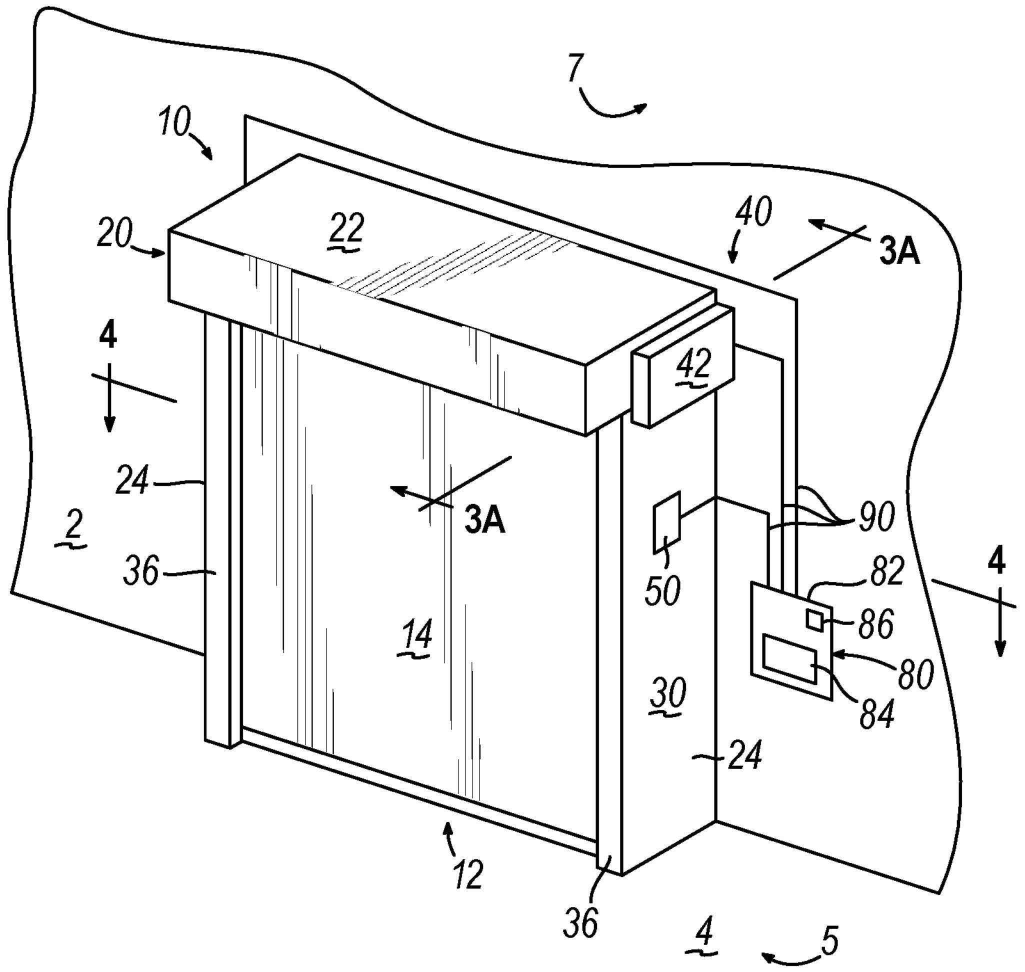
FIG. 2A depicts a perspective view of the dual curtain roll-up door assembly of FIG. 1, where a curtain assembly is in a lowered position.
Figure 2B:
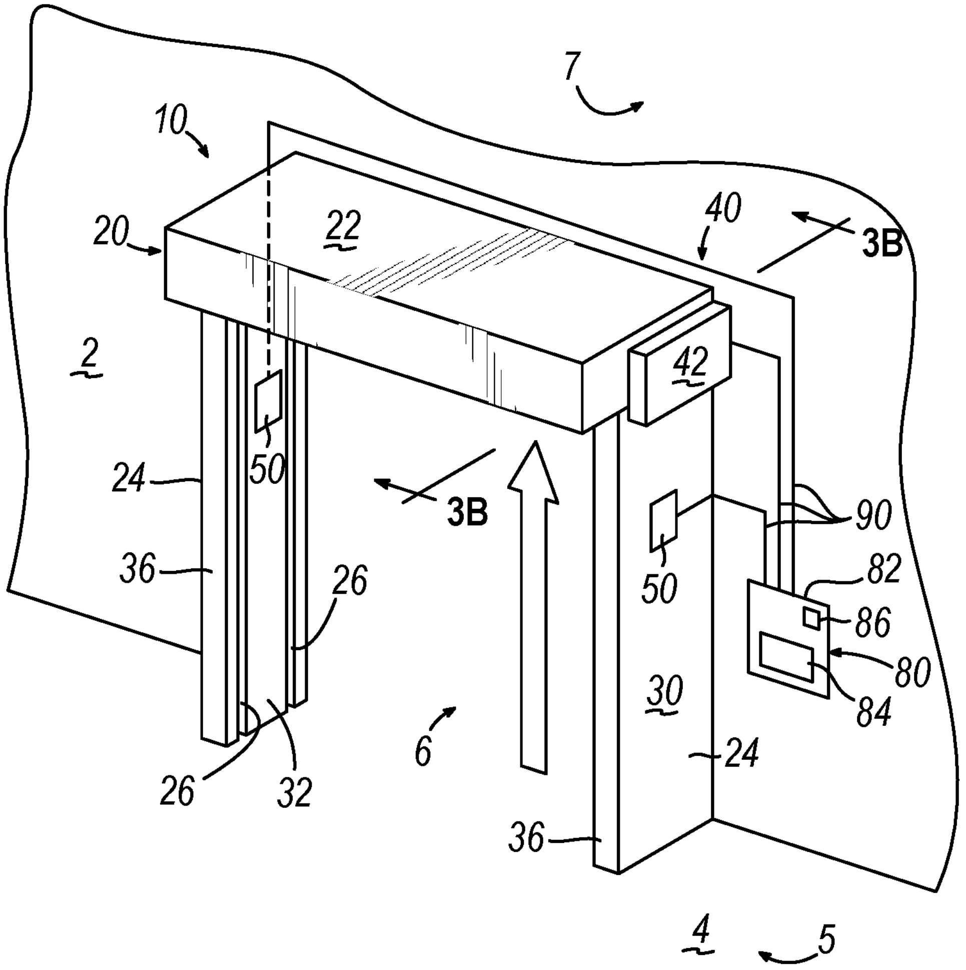
FIG. 2B depicts a perspective view of the dual curtain roll-up door assembly of FIG. 1, where the curtain assembly of FIG. 2A is in a raised position.
Figure 3A:
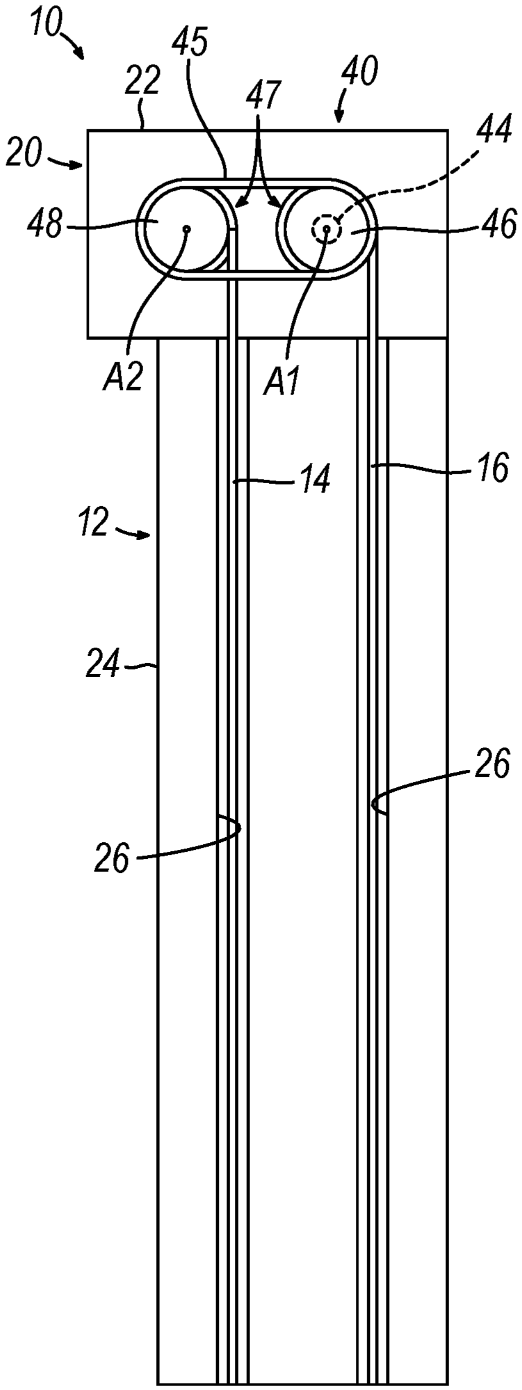
FIG. 3A depicts a cross-sectional view of the dual curtain roll-up door assembly of FIG. 1, taken along line 3A-3A of FIG. 2A.
Figure 3B:
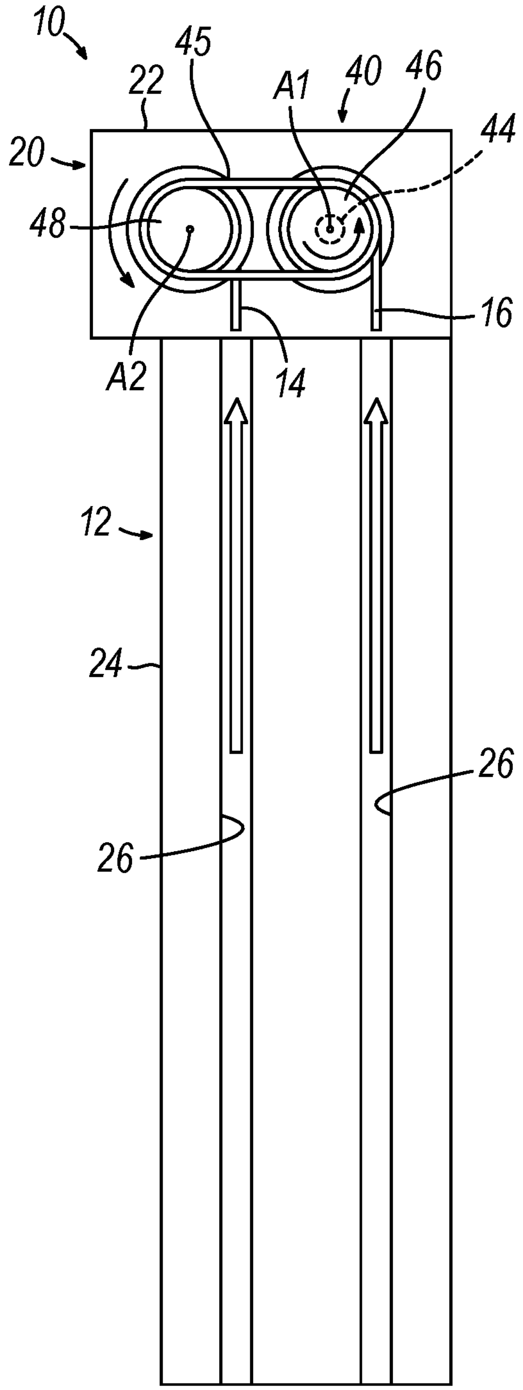
FIG. 3B depicts a cross-sectional view of the dual curtain roll-up door assembly of FIG. 1, taken along line 3B-3B of FIG. 2B.

As will be described in greater detail below, actuation assembly (40) is configured to transition curtain assembly (12) between a lowered position (as best shown in FIGS. 2A and 3A) and a raised position (as best shown in FIGS. 2B and 3B) in order to provide selective access between rooms (5, 7) via an opening (6). As will also be described in greater detail below, internal volume heating assembly (50) is configured to prevent unwanted buildup of condensation on the dual curtain assembly (12); while dual curtain assembly (12) and frame assembly (20) are configured to define an internal volume (18) that may contain, and therefore prevent, unwanted dissipation of heated air generated from internal volume heating assembly (50) when curtain assembly (12) is in the lowered position.

Framing assembly (20) includes a drum assembly housing (22) and a pair of side frames (24). Drum assembly housing (22) is fixed to wall (2) above side frames (24). Drum assembly housing (22) is dimensioned to house a portion of actuation assembly (40) and curtain assembly (12).

Side frames (24) extend vertically along a portion of wall (2) from floor (4) toward drum assembly housing (22). In the current example, frame assembly (20) also extends away from wall (2) into the warmer room (5). However, this is merely optional, as frame assembly (20) may extend away from wall (2) into the cooler room (7). Each side frame (24) includes a lateral outward surface (30), a lateral inward surface (32), a wall mounting surface (34), and an exterior face (36). Wall mounting surface (34) is configured to attach side frames (24) with wall (2) through any suitable means as would be apparent to one skilled in the art in view of the teachings herein.

Lateral inward surface (32) includes a pair of curtain tracks (26) extending vertically. Curtain tracks (26) are dimensioned to slidingly receive a portion of curtain assembly (12). Curtain tracks (26) act as a guide such that as actuation assembly (40) moves curtain assembly (12) in accordance with the description herein, curtain assembly (12) travels along the path defined by tracks (26). Each side fame (24) defines a hollow interior (28) dimensioned to house a respective internal volume heating assembly (50). As will be described in greater detail below, internal volume heating assembly (50) is configured to raise the surface temperature of the warm side of each curtain (12, 14) in order to help prevent unwanted condensation from accumulating on the warm side of each curtain (12, 14)

Dual curtain assembly (12) includes an exterior curtain (14) and an interior curtain (16) that together help define internal volume (18) when curtains (14, 16) are in the lowered position. Curtains (14, 16) may be formed out of any suitable material with any suitable geometry as would be apparent to one skilled in the art in view of the teachings herein. Exterior curtain (14) is positioned furthest away from wall (2), while interior curtain (16) is positioned closest to wall (2). In the current example, the heated side of interior curtain (16) is the surface of interior curtain (16) facing toward internal volume (18); while the heated side of exterior curtain (14) faces toward warmer room (5).

In the current example, two curtains (14, 16) are used, however this is merely optional. For example, any suitable number of intermediate curtains may be implemented as would be apparent to one skilled in the art in view of the teachings herein.

As best seen in FIGS. 1-2B, actuation assembly (40) includes a motor (42) mounted to drum assembly housing (22). As best seen in FIGS. 3A-3B, actuation assembly (40) also includes a drive shaft (44), an interior curtain drum (46), an exterior curtain drum (48), and a belt, chain or other appropriate power transmission device (45). Motor (42) is operatively connected to drive shaft (44) such that motor (42) may rotate drive shaft (44) about a first axis (A1) in a first angular direction and a second angular direction. Motor (42) may have any number of suitable components in order to drive rotation of drive shaft (44) as would be apparent to one skilled in the art in view of the teachings herein.

Interior curtain drum (46) and exterior curtain drum (48) are rotatably disposed within drum assembly housing (22) such that interior curtain drum (46) may rotate about first axis (A1) relative to drum assembly housing (22), and exterior curtain drum (48) may rotate about second axis (A2) relative to drum assembly housing (22). Interior curtain drum (46) is operatively connected to exterior curtain drum (48) via a belt, chain or other transmission device (45) such that rotation of interior curtain drum (46) about first axis (A1) in a rotational direction cause rotation of exterior curtain drum (48) about second axis (A2) in the same rotational direction. Device (45) is disposed between the drums (46, 48) such that device (45) may not slide along the lengths of drums (46, 48) defined by their respective axis (A1, A2). While in the current example, a transmission device (45) is used to couple curtain drums (46, 48), any other suitable components may be used as would be apparent to one skilled in the art in view of the teachings herein.

Drive shaft (44) is operatively connected between motor/reducer (42) and interior curtain drum (46) such that rotation of drive shaft (44) about first axis (A1) drives rotation of interior curtain drum (46) in the same rotational direction. Since interior curtain drum (46) is connected with exterior curtain drum (48) via a power transmission device (45), rotation of interior curtain drum (46) about first axis (A1) in a first rotational direction drives rotation of exterior curtain drum (48) about second axis (A2) in the same rotational direction. Therefore, motor/reducer (42) may simultaneously drive rotation of both curtain drums (46, 48) about their respective axis (A1, A2).

Interior curtain drum (46) and exterior curtain drum (48) are operatively connected to interior curtain (16) and exterior curtain (14), respectively, such that rotation of curtain drums (46, 48) causes respective curtains (16, 14) to wrap and/or unwrap around curtain drums (46, 48), thereby raising or lowering curtains (16, 14) within their respective tracks (26). Interior curtain (16) and exterior curtain (14) are sufficiently flexible to wrap and unwrap around their respective curtain drum (46, 48), thereby transitioning between the raised and lowered positions.

While in the current example, drive shaft (44) is operatively coupled to interior curtain drum (46), this is merely optional, as drive shaft (44) may be operatively coupled to exterior curtain drum (48). Additionally, while in the current example, one drive shaft (44) and a belt (45) is used in order to drive simultaneous rotation of curtain drums (46, 48) about their respective axis (A1, A2), any other suitable rotation driving component may be used as would be apparent to one skilled in the art in view of the teachings herein. For example, motor (42) may be operatively coupled to two drive shafts (44), where a drive shaft (44) couples to a respective curtain drum (46, 48).

Control panel (80) includes a housing (82) storing a user interface (84) and a control module assembly (86). In the current example, control panel (80) is mounted to wall (2). However, this is optional, as control panel (80) may be a self-standing unit. Alternatively, control panel (80) may be located at any other suitable location as would be apparent to one skilled in the art in view of the teachings herein. Control panel (80) may operatively connect with an external power source. Additionally, control panel (80) may be in communication with other various components of dual curtain roll-up door assembly (10) to electrically power such components, such as motor (42) and various components of door control or internal volume heating assembly (50). Of course, other various components of dual curtain roll-up door assembly (10) may be electrically powered by an external power source, rather than by control panel (80).

User interface (84) includes any suitable user controls and visual indicators to allow a user to suitably control the dual curtain roll-up door assembly (10) as would be apparent to one skilled in the art in view of the teachings herein. For instance, user interface (84) may include a power button to activate and deactivate door assembly (10), a plurality of control buttons to suitably control various aspects of internal volume heating assembly (50), a lift button and a lower button to allow a user to open and close door assembly (10) manually in accordance with the description herein, etc.

Control module assembly (86) may include a suitable processor, memory, storage, software, wireless communication system, etc. in order to operate dual curtain roll-up door assembly (10) in accordance with the description herein. Control module assembly (86) is in communication with user interface (84), motor (42), and internal volume heating assembly (50) via communication lines (90). While communication lines (90) are used to establish communication between control module assembly (86) and various components described herein, communication may be established wirelessly. For instance, in examples where motor (42) and various aspects of internal volume heating assembly (50) are electrically powered by an external power source, motor (42) and various aspects of internal volume heating assembly (50) may be in communication with control module assembly (86) via wireless communication.

Control module assembly (86) may selectively activate motor (42) to rotate drive shaft (44) in a first rotational direction or a second rotational direction in order to raise or lower curtain assembly (12) in accordance with the description herein. For example, control module assembly (86) may be in communication with a motion control sensor that is configured to detect sufficient movement in front of door assembly (10) from either room (5, 7). Such movement may be indicative of a person wishing to travel between rooms (5, 7). Therefore, control module assembly (86) may activate motor (42) in response to motion control sensors detecting sufficient movement such that motor (42) rotates drive shaft (44) in the first angular direction, which in turn rotates drums (46, 48) to wrap curtains (16, 14) around drums (46, 48), thereby raising curtains (16, 14) along tracks (26) (as shown between FIGS. 3A-3B). After a sufficient amount of time for a person to travel through door assembly (10), or after a sufficient amount of time where motion control sensors fail to detect sufficient movement in front of door assembly (10), or after any other suitable indicator as would be apparent to a person skilled in the art in view of the teachings herein, control module assembly (86) may then communicate to activate motor (42) such that motor (42) rotates drive shaft (44) in the second angular direction, which in turn rotates drums (46, 48) to unwrap curtains (16, 14) around drums (46, 48), thereby lowering curtains (16, 14) along tracks (26).

Alternatively, control module assembly (86) may activate motor (42) to raise or lower curtains (16, 14) in response to a signal generated manually by user interface (84). Any other suitable means of determining when to raise and lower curtains (16, 14) in accordance with the description herein may be used as would be apparent to one skilled in the art in view of the teachings herein.

II. Exemplary Internal Volume Heating Assemblies for Dual Curtain Roll-Up Door Assembly As mentioned above, dual curtain roll-up door assembly (10) may be installed between two rooms having differing temperatures, such as a warmer room (5) a cooler room (7) (i.e. a lower temperature conditioned space). It should be understood that cooler room (7) may have a lower temperature than warmer room (5) through any suitable means that would be apparent to one skilled in the art in view of the teachings herein. For instance, cooler room (7) may be a walk-in-freezer. In some instances, dual curtain roll-up door assembly (10) may provide access into a building from the outdoors. In such an instance, the "cooler room" (7) may be the outdoors in the winter months, while the "warmer room" (5) may be the outdoors in the summer months. Due to the differing temperatures between rooms (5, 7), a warm side of each curtain (14, 16) may develop unwanted condensation if the surface temperature of the warm side of curtain (14, 16) is below the respective dew point of air in contact with said warm side.

As will be described in greater detail below, internal volume heating assembly (50) is configured to prevent condensation from developing by raising the temperature of the side of each curtain (14, 16) that faces away from the cooler room above their respective dew point. As will also be described in greater detail below, volume (18) is configured to at least partially retain heated air generated by the internal volume heating assembly (50) such that internal volume (18) may better prevent dissipation of thermal energy as compared to a roll-up door assembly (10) with one flexible curtain. Therefore, less energy may be required for internal volume heating assembly (50) to prevent condensation from developing through use of a dual curtain assembly (12) defining volume (18) as compared to a single curtain assembly.

Figure 4:
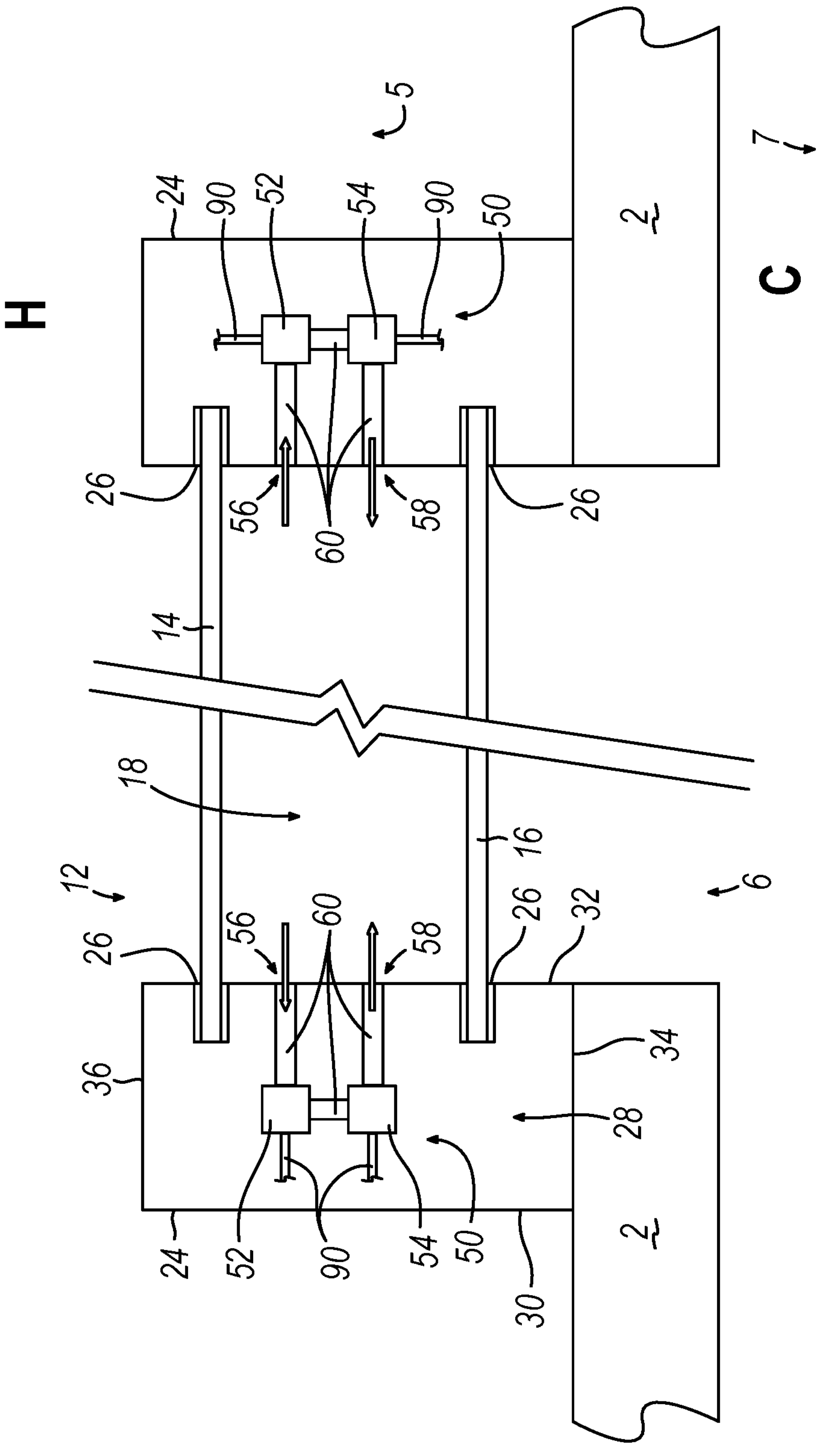
FIG. 4 depicts a cross-sectional view of the dual curtain roll-up door assembly of FIG. 1, taken along line 4-4 of FIG. 2A, where the dual curtain roll-up door assembly is positioned between a warmer room and a cooler room, where the dual curtain roll-up door assembly extends from a wall toward the warmer room.

A. Exemplary Internal Volume Heating Assembly for Warm Side Mounted Roll-Up Door Assembly FIG. 4 shows dual curtain roll-up door assembly (10) mounted on wall (2) facing warmer room (5). In such an instance, the surface of exterior curtain (14) facing warmer room (5) and the surface of interior curtain (16) facing internal volume (18) are the warm side of each curtain (14, 16), since those sides of curtains (14, 16) are in direct thermal communication with air that is presumably warmer than the respective opposite side of curtains (14, 16).

As mentioned above, the warm side of exterior curtain (14) (the side of curtain (14) facing warmer room (5)) is susceptible to developing condensation if the surface temperature of exterior curtain (14) is below the dew point of the air within the warmer room (5); while the warm side of interior curtain (16) (the side of curtain (16) facing internal volume (18)) is susceptible to developing condensation if the surface temperature of interior surface (16) is below the dew point of the air within internal volume (18).

As also mentioned above, each side frame (24) defines a hollow interior (28) housing a respective internal volume heating assembly (50). Internal volume heating assembly (50) includes a heating element (52), a circulation element (54), and ducts (60) defining a fluid pathway between an inlet (56), heating element (52), circulation elements (54), and an outlet (58).

Heating element (52) is configured to receive air from inlet (56) and raise the temperature of received air to a desired temperature, while circulation element (54) is configured to circulate air from inlet (56), through both heating element (52) and circulation element (54), and back into internal volume (18) via outlet (58). Generally, the temperature at which heating element (52) heats circulated air is above the dew point for the warm side of each curtain (14, 16). When curtains (14, 16) are in the lowered position, the circulated heated air may be contained by internal volume (18), such that thermal energy generated by heating element (52) does not overly dissipate into the external environments of rooms (5, 7). Due to more thermal energy being contained within internal volume (18), which in turn raises the surface temperatures of curtains (14, 16), heating element (52) may not have to expend as much energy to maintain the desired surface temperatures of curtains (14, 16) to prevent condensation buildup.

In the current example, heating element (52) and circulation element (54) are shown as two distinct pieces. However, this is merely optional. For instance, heating element (52) and circulation element (54) may be an integrated unit configured to both heat air and circulate air. Heating element (52) and circulation element (54) may or may not be in electrical communication with control module assembly (86) via communication lines (90). Therefore, in some instances, control module assembly (86) may selectively activate heating element (52) and circulation element (54), as well as control the various parameters at which heating element (52) and circulation element (54) operate. In other instances, heating element (52) and circulation element (54) may be directly coupled to an external power source rather than control module assembly (86).

The temperature at which heating element (52) operates may be determined through any suitable means as would be apparent to one having ordinary skill in the art in view of the teachings herein. For instance, a user may enter the targeted temperatures of warmer room (5) and cooler room (7) via user interface (84). Control module assembly (86) may then execute an algorithm to determine the targeted temperature at which curtains (14, 16) must be heated to prevent condensation buildup. Control module assembly (86) may modify this algorithm in response to how frequently and for how long roll-up door assembly (10) is in the raised position. A user may also enter any other suitable variables that control module assembly (86) may use to determine how heating element (52) operates. Such variables will be apparent to one skilled in the art in view of the teachings herein, such as relative humidity, humidity, etc. Control module assembly (86) may also be in communication with thermostats or other suitable sensors located in each room (5, 7) in order to actively modify how heating element (52) operates.

Figure 5:
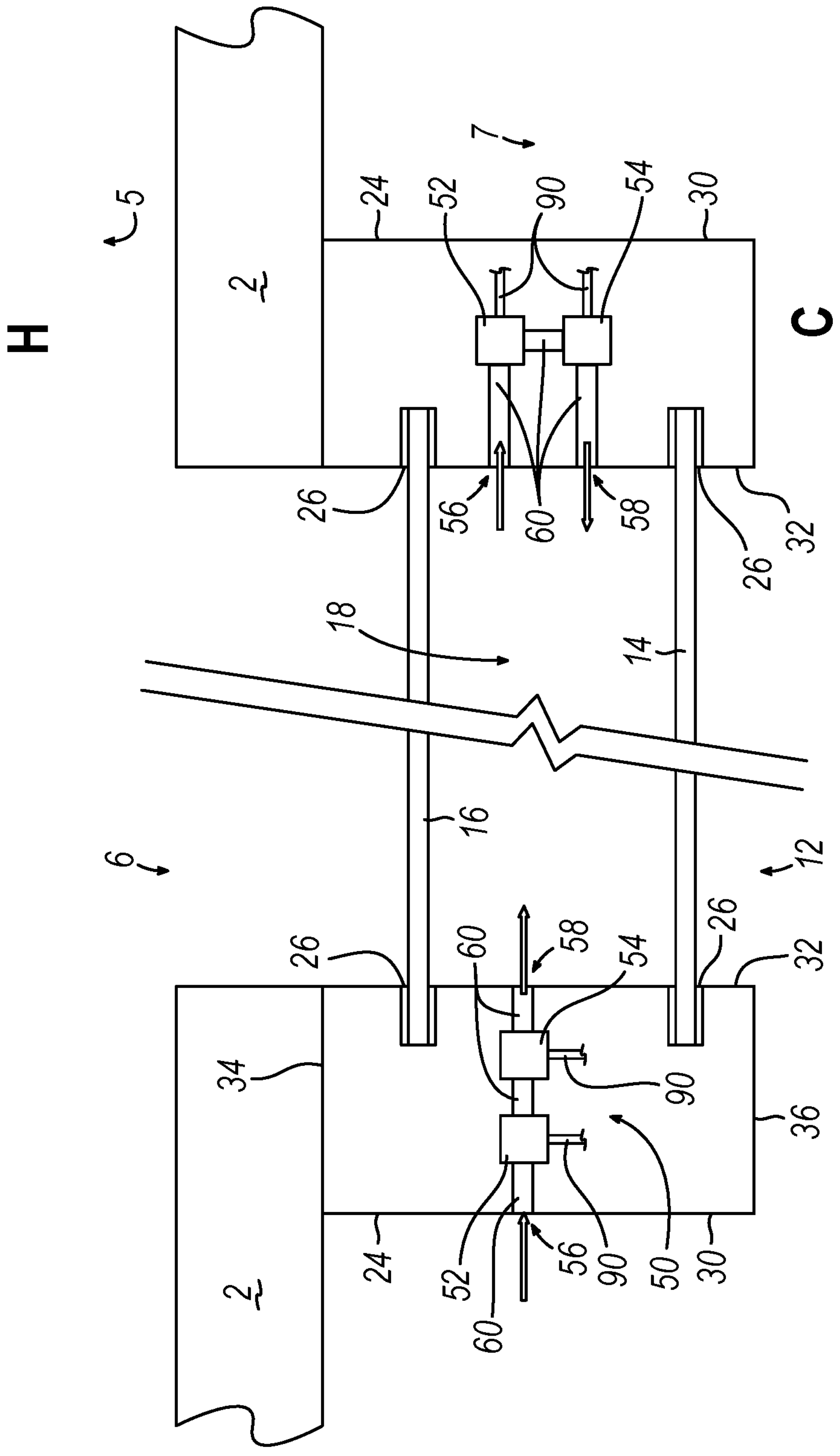
FIG. 5 depicts a cross-sectional view of the dual curtain roll-up door assembly of FIG. 1, taken along line 4-4 of FIG. 2A, where the dual curtain roll-up door assembly is positioned between a warmer room and a cooler room, where the dual curtain roll-up door assembly extends from a wall toward the cooler room.

B. Exemplary Internal Volume Heating Assembly for Cold Side Mounted Roll-Up Door Assembly FIG. 5 shows dual curtain roll-up door assembly (10) mounted on wall (2) facing cooler room (7). In such an instance, the surface of exterior curtain (14) facing internal volume (18) and the surface of interior curtain (16) facing warmer room (5) are the warm side of each curtain (14, 16), since those sides of curtains (14, 16) are in direct thermal communication with air that is presumably warmer than the respective opposite side of curtains (14, 16).

As mentioned above, the warm side of exterior curtain (14) (the side of curtain (14) facing internal volume (18)) is susceptible to developing condensation if the surface temperature of exterior curtain (14) is below the dew point of the air within internal volume (18); while the warm side of interior curtain (16) (the side of curtain (16) facing warmer room (5)) is susceptible to developing condensation if the surface temperature of interior curtain (16) is below the dew point of the air within warmer room (5).

As also mentioned above, the air in cooler room (7) may have a lower dew point compared to the air in warmer room (5) based, in part, on the removed moisture of the conditioned air within cooler room (7). Therefore, if air from cooler room (7) is circulated into internal volume (18), the dew point within internal volume (18) may be lower than if air was only recirculated in the internal volume (18) or air from another source (such as warmer room (5)) were circulated into internal volume (18). This may require less thermal energy to prevent condensation from building up on the warm side of exterior curtain (14).

As best shown in FIG. 5, dual curtain roll-up door assembly (10) mounted on wall (2) facing cooler room (7) includes a first internal volume heating assembly (50) associated with side frame (24) on the right side that is substantially similar to internal volume heating assemblies (50) described above for dual curtain roll-up door assembly (10) mounted on wall (2) facing warmer room (5) shown in FIG. 4. Therefore, heating element (52) is configured to receive air from inlet (56) and raise the temperature of received air to a desired temperature, while circulation element (54) is configured to circulate air from inlet (56), through both heating element (52) and circulation element (54), and back into internal volume (18) via outlet (58).

The second internal volume heating assembly (50) associated with side frame (24) on the left side is substantially similar to first internal volume heating assembly (50) described above, except that inlet (56) is located on lateral outward facing surface (30) such that inlet (56) takes in air from cooler room (7). As mentioned above, air from cooler room (7) may have a lower dew point since moisture is removed from air within cooler room (7) during the climate control process. With air from cooler room (7) being distributed into internal volume (18), the dew point of air within internal volume (18) may be lowered. Therefore, the amount of heat which heating elements (52) must generate to prevent accumulation of condensation on the warm side of exterior curtain (14) may be reduced. While inlet (56) is located on lateral outward surface (30), this is merely optional, as inlet (56) may be located on any portion of side frame (24) exposed to cooler room (7).

It should be noted that if inlet (56) were located on lateral outward surface (30) of dual curtain roll-up door assembly (10) mounted on wall (2) facing warmer room (5), the air distributed from warmer room (5) would not have as much moisture removed due to the difference in temperatures caused by the climate controlled process.

III. Exemplary Alternative Internal Volume Heating Assembly and Side Frame

It may be desirable to have a side frame assembly (24) and internal volume heating assembly (50) with adjustable inlet assemblies that may be modified to distribute air from cooler room (7) into internal volume (18), regardless of whether roll-up door assembly (10) extends into warmer room (5) or cooler room (7). Additionally, it may be desirable to control the ratio of air from cooler room (7) and recirculated air from internal volume (18) that is processed by internal volume heating assembly (50) and distributed through outlet (58) in order to efficiently control the temperature and dew point of air within internal volume (18). It may also be desirable to control the ratio of air supplied through outlet (58) and the thermal energy which heating element (52) operates in response to real-time feedback from within internal volume (18), warmer room (5), and cooler room (7).

Figure 6:
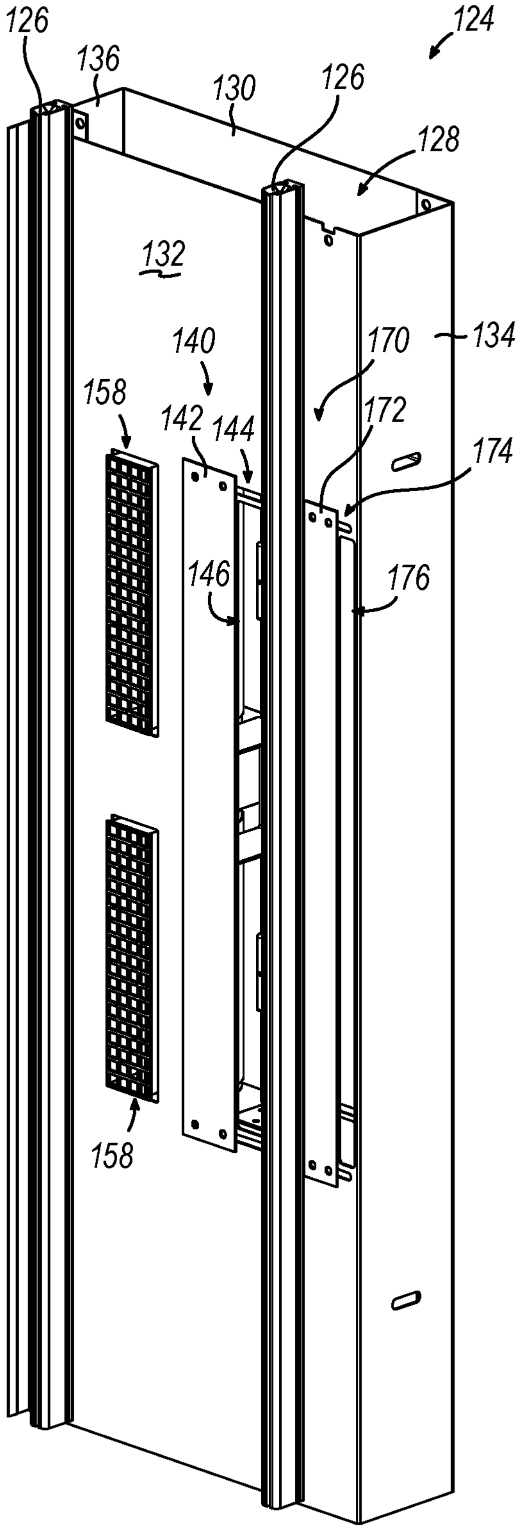
FIG. 6 depicts a perspective view of an alternative side frame that may be readily incorporated into the roll-up door assembly of FIG. 1.
Figure 7:
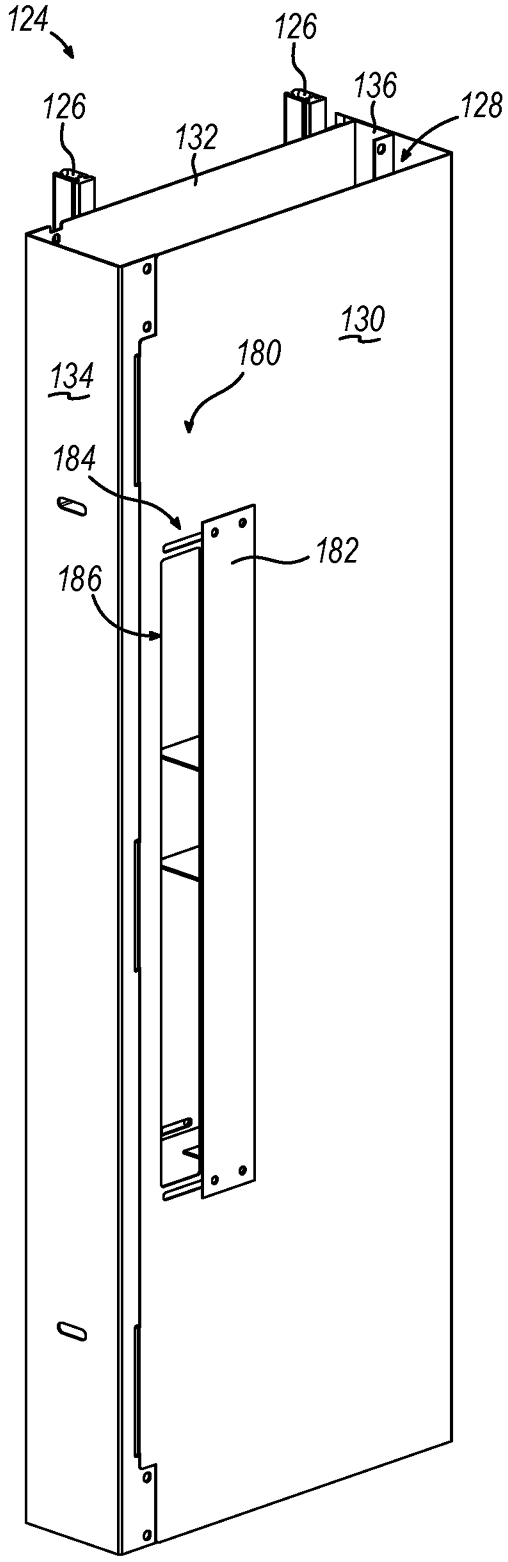
FIG. 7 depicts another perspective view of the side frame of FIG. 6.

FIGS. 6-7 show an exemplary alternative side frame (124) that may be readily incorporated into dual curtain roll-up door assembly (10); while FIGS. 8-11 show side frame (124) and alternative internal volume heating assembly (150) incorporated into roll-up door assembly (10) in various configurations. As will be described in greater detail below, side frame (124) includes three adjustable inlet assemblies (140, 170, 180) that may be adjusted between an open and closed position during installation such that an associated internal volume heating assembly (150) may circulate air from cooler room (7) into internal volume (18) as well as recirculate air from internal volume (18).

A. Exemplary Alternative Internal Volume Heating Assembly with Dampers and Sensors As best shown in FIGS. 8-11, alternative internal volume heating assembly (150) includes a heating element (152), a circulation element (154), and a variety of ducts (160) for providing fluid communication between heating element (152), circulation element (154), various inlet assemblies (140, 170, 180), and outlet (158). Heating element (152), circulation element (154), and ducts (160) may be substantially similar to heating element (52), circulation element (54), and ducts (60) described above, respectively, with differences elaborated below.

Internal volume heating assembly (150) also includes dampers (110) and a plurality of sensors (112). In the current example, dampers (110) are in electrical communication with control module assembly (86) (see FIGS. 1-2B) via communication lines (90). In the current example, dampers (110) are installed within ducts (160) located between various inlet assemblies (140, 170, 180) and heating element (152). Dampers (110) are configured to control the volumetric flow of fluid communication between various inlet assembly (140, 170, 180) and heating element (152) such that dampers (110) may in turn control the ratio of recirculated air from internal volume (18) compared to air from cooler room (7) traveling through heating element (152), circulation element (154), outlet (158), and into internal volume (18) during exemplary operation. In other words, dampers (110) may control the amount of air originating from internal volume (18) and cooler room (7) that is fed into heating element (152). In some instances, dampers (110) may not be in communication with control module assembly (86), such that dampers (110) are manually controlled.

While in the current example, dampers (110) are installed within ducts (160) to control the volumetric flow of fluid communication in accordance with the description herein, this is merely optional. In some examples, adjustable covers (142, 172, 182) may be configured to actuate between an open position, a partially open position, and a closed position in accordance with the description below in order to control the volumetric flow of fluid between various inlet assemblies (140, 170, 180) and heating element (152). In other words, adjustable covers (142, 172, 182) may be operable in a substantially similar manner as dampers (110) described above, in replacement of, or in addition to, dampers (110).

Sensors (112) are positioned on frame (124) such that one sensor (112) is located within warmer room (5), cooler room (7), and within internal volume (18). Each sensor (112) is in electrical communication with control module assembly (86) via communication lines (90). Sensors (112) are configured to transmit suitable data to control module assembly (86) related to the environment in which sensor (112) is located. Control module assembly (86) may further use transmitted data from sensor (112) in order to generate suitable instructions for heating element (152) and dampers (110) to efficiently heat curtains (14, 16) to thereby prevent condensation buildup.

Control module assembly (86) may use data from sensors (112) to change the ratio at which air originally from internal volume (18) and cooler room (7) is fed into heating element (152). Additionally, or alternatively, control module assembly (86) may use data from sensors (112) to change the amount of thermal energy heating element (152) generates. For instance, control module assembly (86) may use data from sensors (112) to determine more cold air from cooler room (7) should be distributed into internal volume (18) in order to reduce the dew point within internal volume (18). As such, control module assembly (86) may then determine heating element (152) may operate at a lower energy output in order to suitably prevent condensation buildup on the warm side of each curtain (14, 16).

Any suitable sensor (112) may be used as would be apparent to one skilled in the art in view of the teachings herein. For instance, a thermometer, a hydrometer, a moisture meter, a multifunction dew point thermometer, etc. may be used for sensor (112). Additionally, any suitable damper (110) may be used as would be apparent to one skilled in the art in view of the teachings herein.

B. Exemplary Side Frame with Adjustable Inlet Assemblies for Both Warm Side and Cold Side Mounted Roll-Up Door Assemblies Side frame (124) includes curtain tracks (126), a lateral outward surface (130), a lateral inward surface (132), a wall mounting surface (134), and an exterior surface (136), which are substantially similar to curtain tracks (26), lateral outward surface (30), lateral inward surface (32), wall mounting surface (34), and exterior face (36) described above, respectively, with differences elaborated below. Curtain tracks (126) are dimensioned to slidably guide curtains (14, 16) between the lowered position and the raised position. Side frame (124) also defines a hollow interior (128) that is substantially similar to hollow interior (28) described above. Hollow interior (128) is dimensioned to house an associated internal volume heating assembly (150).

As best seen in FIG. 6, an internal volume adjustable inlet assembly (140) and an outlet (158) are associated with a portion of lateral inward surface (132) located between curtain tracks (126). Therefore, when dual curtain roll-up door assembly (10) is installed with alternative side frame (124) incorporated in replacement of side frame (24), both internal volume adjustable inlet assembly (140) and outlet (158) are directly adjacent to internal volume (18). Outlet (158) is substantially similar to outlet (58) described above. Therefore, outlet (158) is in fluid communication with internal volume (18).

Internal volume adjustable inlet assembly (140) includes an adjustable cover (142). Additionally, internal volume adjustable inlet assembly (140) includes a slot (144) and an inlet opening (146) defined by lateral inward surface (132). Adjustable cover (142) is slidably attached to lateral inward surface (132) via slot (144) and mounting bolts (or any other suitable fastening element). Adjustable cover (142) may slide along the path defined by slot (144) in order to transition between an open position, a partially open position, or a closed position. Adjustable cover (142) is shown in the open position in FIG. 6. When adjustable cover (142) is in the open position or partially open position, inlet opening (146) may be in fluid communication with internal volume (18) such that a duct (160) may provide fluid communication between internal volume (18) and a heating element (152). Adjustable inlet assembly (140) may be in fluid communication with internal volume (18) in the open position. When adjustable cover (142) is in the closed position, inlet opening (146) is not in fluid communication with internal volume (18). During installation, a technician may have the option to provide fluid communication between inlet opening (146) and internal volume (18) in order to feed heating element (152) with recirculated air from internal volume (18).

As also best seen in FIG. 6, a first outer volume adjustable inlet assembly (170) is associated with a portion of lateral inward surface (132) located between wall mounting surface (134) and curtain track (126) associated with interior curtain (16).

First outer volume adjustable inlet assembly (170) includes an adjustable cover (172). Additionally, first outer volume adjustable inlet assembly (170) includes a slot (174) and an inlet opening (176) defined by lateral inward surface (132). Adjustable cover (172) is slidably attached to lateral inward surface (132) via slot (174) and mounting bolts (or any other suitable fastening element). Adjustable cover (172) may slide along the path defined by slot (174) in order to transition between an open position, a partially open position, or a closed position. Adjustable cover (172) is shown in the open position in FIG. 6. Adjustable cover (172) may be in the open position or partially open position when side frame (124) is mounted to wall (2) and extending into warmer room (5) in order to provide fluid communication between cooler room (7) and internal volume (18). Adjustable cover (172) may be in the closed position when side frame (124) is mounted to wall (2) and extending into cooler room (7) in order to prevent fluid communication between warmer room (5) and internal volume (18).

As best seen in FIG. 7, a second outer volume adjustable inlet assembly (180) is associated with a portion of lateral outward surface (130). Second outer volume adjustable inlet assembly (180) includes an adjustable cover (182). Additionally, second outer volume adjustable inlet assembly (180) includes a slot (184) and an inlet opening (186) defined by lateral outward surface (130). Adjustable cover (182) is slidably attached to lateral outward surface (130) via slot (184) and mounting bolts (or any other suitable fastening element). Adjustable cover (182) may slide along the path defined by slot (184) in order to transition between an open position, a partially open position, or a closed position. Adjustable cover (182) is shown in the open position in FIG. 7. Adjustable cover (182) may be in the closed position when side frame (124) is mounted to wall (2) and extending into warmer room (5) in order to prevent fluid communication between warmer room (5) and internal volume (18). Adjustable cover (182) may be in the open position or the partially open position when side frame (124) is mounted to wall (2) and extending into cooler room (7) in order to provide fluid communication between cooler room (7) and internal volume (18).

C. Exemplary Side Frame with Adjustable Inlet Assembly Mounted on Warm Side

Figure 8:
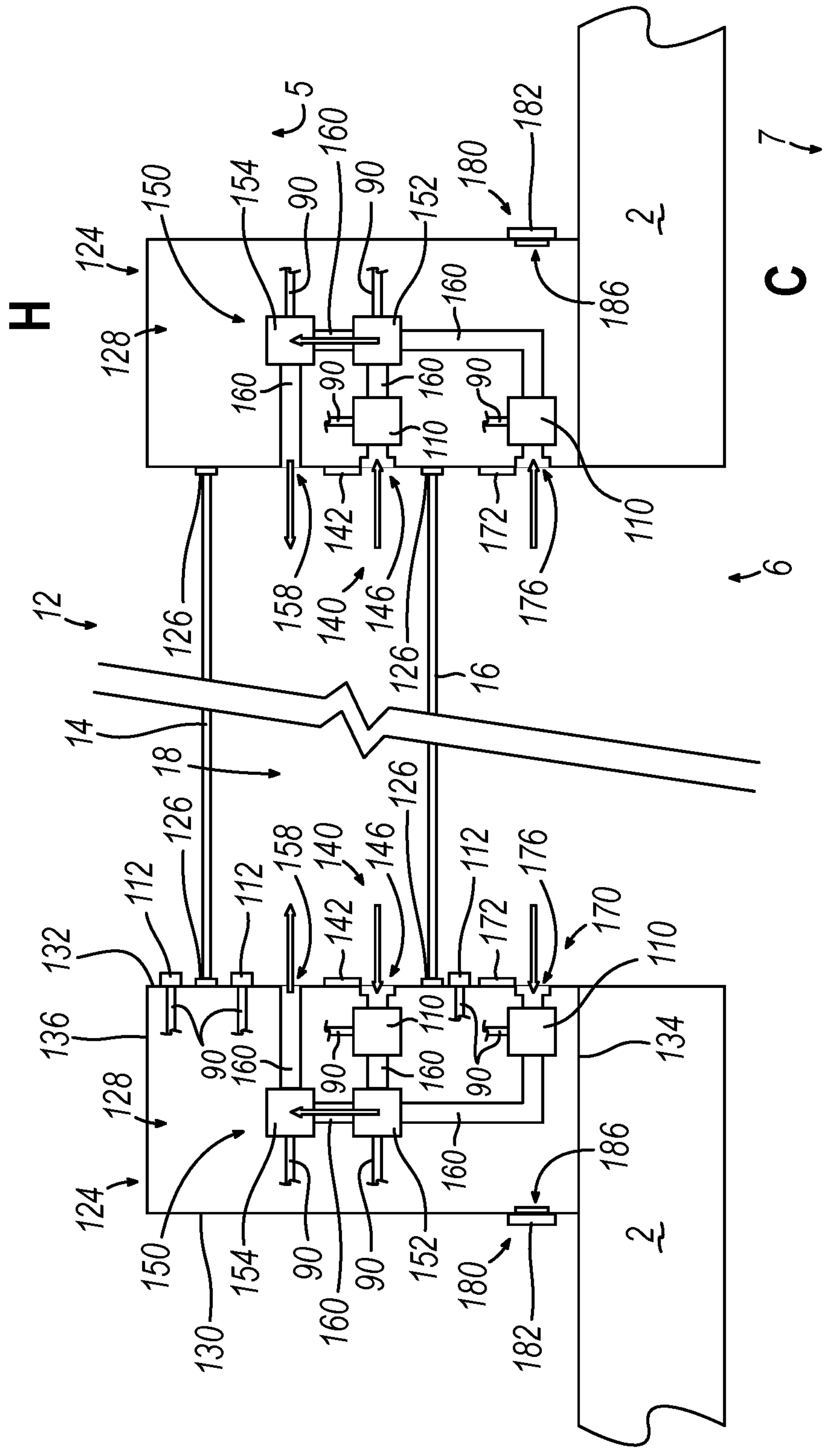
FIG. 8 depicts a cross-sectional view of a dual curtain roll-up door assembly with two side frames of FIG. 6 incorporated in a first configuration, where the dual curtain roll-up door assembly is positioned between a warmer room and a cooler room, where the dual curtain roll-up door assembly extends from a wall toward the warmer room.
Figure 9:
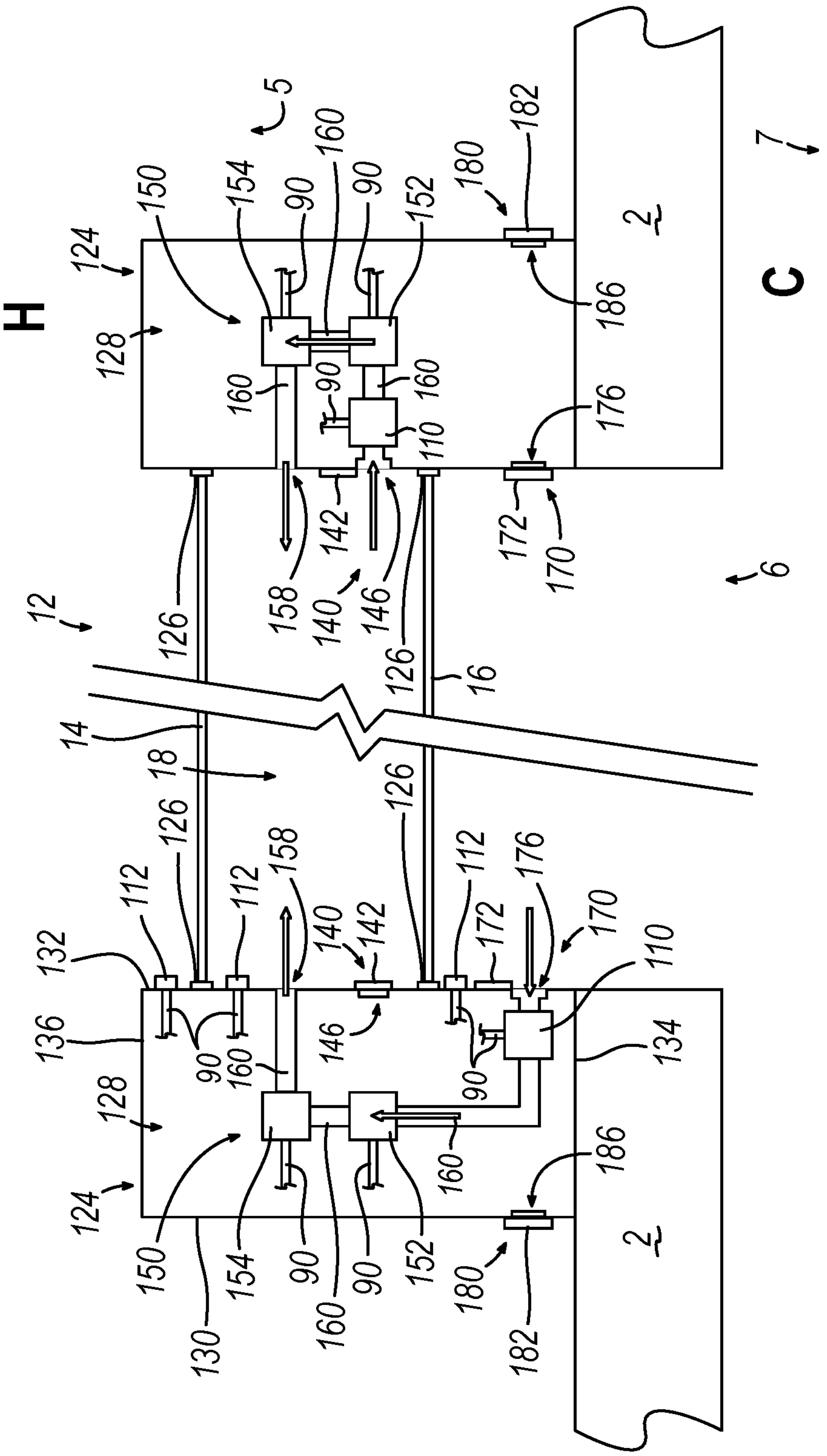
FIG. 9 depicts a cross-sectional view of a dual curtain roll-up door assembly with two side frames of FIG. 6 incorporated in a second configuration, where the dual curtain roll-up door assembly is positioned between a warmer room and a cooler room, where the dual curtain roll-up door assembly extends from a wall toward the warmer room.

FIGS. 8-9 show two exemplary installations of roll-up door assembly (10) that incorporate side frame (124) and internal volume heating assembly (150) extending into a warmer room (5). In particular, FIG. 8 shows roll-up door assembly (10) where internal volume heating assemblies (150) in both side frames (124) are configured such that heating element (152) receives air from both internal volume (18) and cooler room (7); while FIG. 9 shows roll-up door assembly (10) where one side frame (124) receives air from internal volume (18) and the other side frame (124) receives air from cooler room (7).

Referring to the installation of roll-up door assembly (10) shown in FIG. 8, adjustable covers (142, 172) of internal volume adjustable inlet assembly (140) and first outer volume adjustable inlet assembly (170) are in the open position. Ducts (160) extend from both inlet openings (146, 176) and connected to heating element (152). Heating element (152) is in fluid communication with circulation element (154) via another duct (160), while circulation element (154) is in fluid communication with outlet (158).

Therefore, heating element (152) may receive and heat air from both inlet openings (146, 176), in any suitable ratio such that circulation element (154) may circulate the recently heated air back into internal volume (18) via duct (160) and outlet (158). As such, heating element (152) and circulation element (154) may circulate a desired ratio of air originating from internal volume (18) and cooler room (7) into internal volume (18) to raise the temperatures of both curtains (14, 16) to prevent condensation from building up on the warm sides of curtains (14, 16). Since air from cooler room (7) may be circulated into internal volume (18), the dew point of air within internal volume (18) may be lowered such that the power requirement of heating element (152) may be reduced to heat internal volume (18).

It should be understood that since second outer volume adjustable inlet assembly (180) is exposed to warmer room (5), adjustable cover (182) is assembled in the closed position such that air from warmer room (5) is inhibited from being distributed into internal volume (18).

Again, dampers (110), adjustable covers (142, 172), and sensors (112) may be utilized in accordance with the description herein to determine the ratio of air to be circulated into internal volume (18) originating from internal volume (18) and cooler room (7). Additionally, dampers (110), adjustable covers (142, 172), and sensors (112) may be utilized in accordance with the description herein to determine the energy level heating element (152) operates to achieve the target temperature of internal volume (18).

Figure 10:
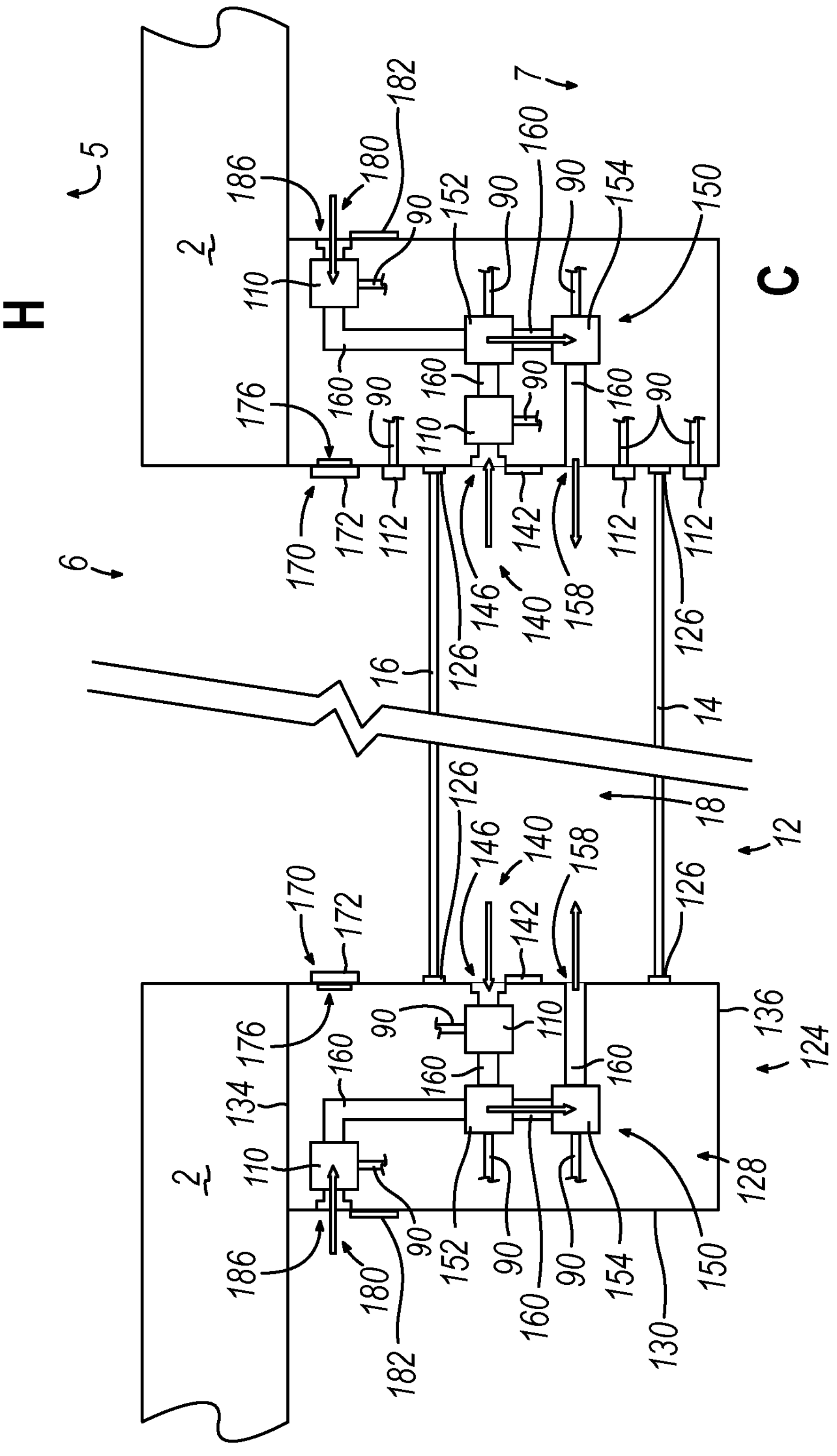
FIG. 10 depicts a cross-sectional view of a dual curtain roll-up door assembly with two side frames of FIG. 6 incorporated in a third configuration, where the dual curtain roll-up door assembly is positioned between a warmer room and a cooler room, where the dual curtain roll-up door assembly extends from a wall toward the cooler room.

Roll-up door assembly (10) shown in FIG. 9 operates substantially similar to roll-up door assembly (10) of FIG. 10, except internal volume heating assembly (150) shown on the right is only in fluid communication with internal volume (18), while internal volume heating assembly (150) shown on the left is only in fluid communication with cooler room (7). As such, adjustable cover (172) for side frame (124) shown on the right is in the closed position; while adjustable cover (142) for side frame (124) shown on the left is in the closed position.

D. Exemplary Side Frame with Adjustable Inlet Assembly Mounted on Cold Side

Figure 11:
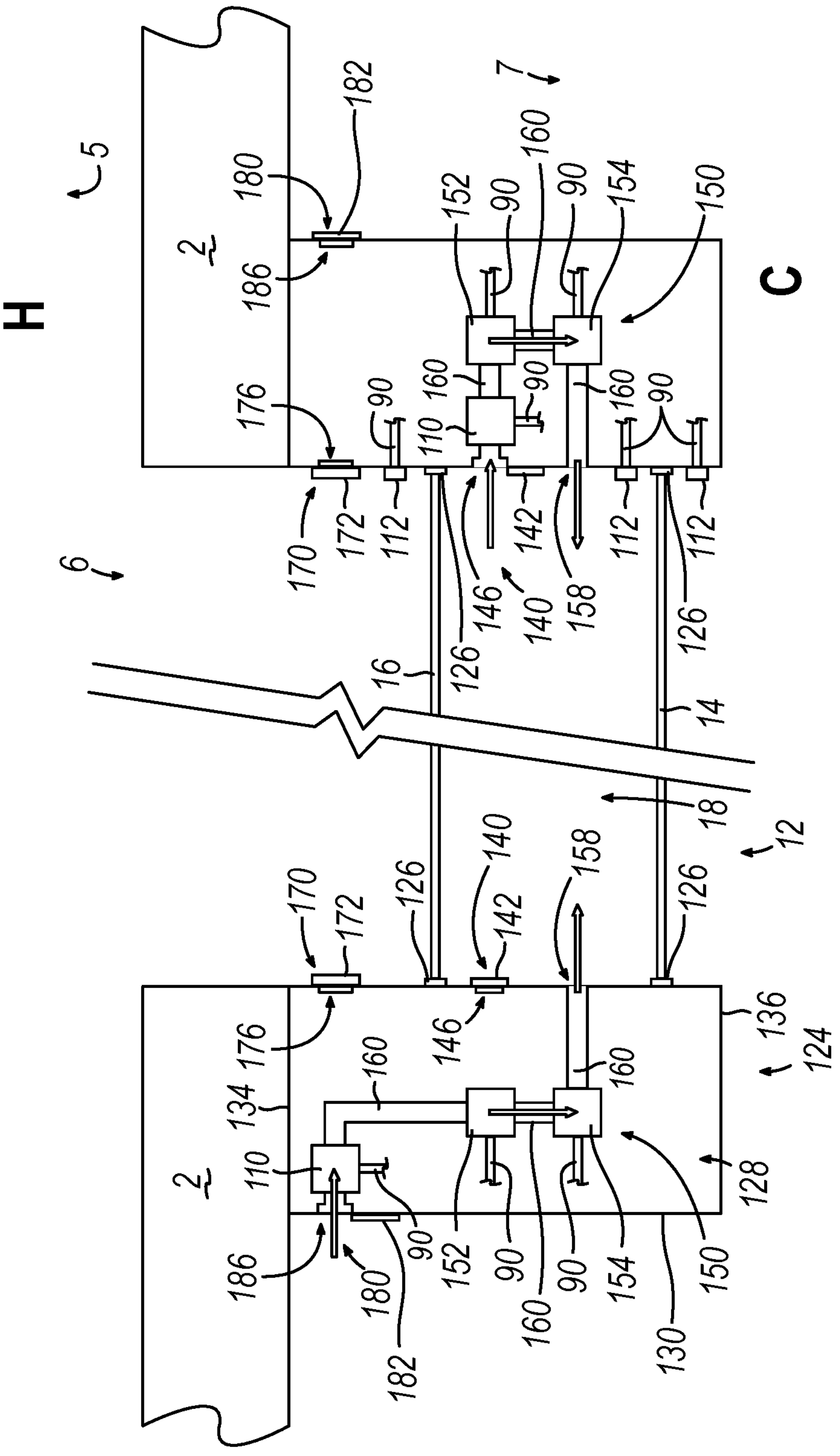
FIG. 11 depicts a cross-sectional view of a dual curtain roll-up door assembly with two side frames of FIG. 6 incorporated in a fourth configuration, where the dual curtain roll-up door assembly is positioned between a warmer room and a cooler room, where the dual curtain roll-up door assembly extends from a wall toward the cooler room.

FIGS. 10-11 show two exemplary installations of roll-up door assembly (10) that incorporate side frame (124) and internal volume heating assembly (150) extending toward cooler room (7). In particular, FIG. 10 shows roll-up door assembly (10) where internal volume heating assemblies (150) in both side frames (124) are configured such that heating element (152) receives air form both internal volume (18) and cooler room (7); while FIG. 11 shows roll-up door assembly (10) where one side frame (124) receives air from internal volume (18) and the other side frame (124) receives air from cooler room (7).

Referring to the installation of roll-up door assembly (10) shown in FIG. 10, adjustable covers (142, 182) of internal volume adjustable inlet assembly (140) and second outer volume adjustable inlet assembly (180) are in the open position. Ducts (160) extend from both inlet openings (146, 186) and connected to heating element (152). Heating element (152) is in fluid communication with circulation element (154) via another duct (160), while circulation element (154) is in fluid communication with outlet (158).

Therefore, heating element (152) may receive and heat air from both inlet openings (146, 186), in any suitable ratio such that circulation element (154) may circulate the recently heated air back into internal volume (18) via duct (160) and outlet (158). As such, heating element (152) and circulation element (154) may circulate a desired ratio of air originating from internal volume (18) and cooler room (7) into internal volume (18) to raise the temperatures of both curtains (14, 16) to prevent condensation from building up on the warm sides of curtains (14, 16). Since air from cooler room (7) may be circulated into internal volume (18), the dew point of air within internal volume (18) may be lowered such that the power requirement of heating element (152) may be reduced to heat internal volume (18).

It should be understood that since first outer volume adjustable inlet assembly (170) is exposed to warmer room (5), adjustable cover (172) is assembled in the closed position such that air from warmer room (5) is inhibited from being distributed into internal volume (18).

Again, dampers (110), adjustable covers (142, 182), and sensors (112) may be utilized in accordance with the description herein to determine the ratio of air to be circulated into internal volume originating from internal volume (18) and cooler room (7). Additionally, dampers (110), adjustable covers (142, 182), and sensors (112) may be utilized in accordance with the description herein to determine the energy level heating element (152) operates to achieve the target temperature of internal volume (18).

Roll-up door assembly (10) shown in FIG. 11 operates substantially similar to roll-up door assembly (10) of FIG. 10, except internal volume heating assembly (150) shown on the right is only in fluid communication with internal volume (18), while internal volume heating assembly (150) shown on the left is only in fluid communication with cooler room (7). As such, adjustable cover (182) for side frame (124) shown on the right is in the closed position; while adjustable cover (142) for side frame (124) shown on the left is in the closed position.

It should be understood that the adjustable nature of all three inlet assemblies (140, 170, 180) allows side frame (124) to be readily installed such that roll-up door assembly (10) may extend into either warmer room (5) or cooler room (7). This may provide an advantage of only requiring a single side frame (124) to be manufactured and distributed with roll-up door assembly (10), rather than requiring a prefabricated side frame (124) with the single intention of being mounted on only the cooler room (7) or only the warmer room (5). Additionally, since inlet assemblies (140, 170, 180) are readily adjustable, inlet assemblies (140, 170, 180) may be easily modified to provide fluid communication between cooler room (7) and internal volume (18) in cases where the cooler room (7) and the warmer room (5) are reversed after installation. In other words, if cooler room (7) and warmer room (5) are swapped after installation of roll-up door assembly (10) such that the original cooler room (7) is now the updated warmer room (5), inlet assemblies (140, 170, 180) may be easily adjusted such that internal volume heating assemblies (150) are in fluid communication with the updated cooler room (7). This may be desirable when roll-up door assembly (10) provides access into a building from the outdoors.

IV. Exemplary Alternative Side Frame with Air Heated Duct to Prevent Condensation on Side Frame In some instances, it may be desirable to prevent condensation buildup on side frame (24, 124) itself, in addition to preventing condensation buildup on curtains (14, 16). Typically, hollow interior (28, 128) of side frame (24, 124) includes a resistance wire extending vertically within frame (24, 124) in order to sufficiently heat side frame (24, 124) to prevent condensation buildup. However, it may be desirable to simplify the installation process by removing the need to install a resistance wire all together, while still sufficiently heating side frame (24, 124).

Figure 12:
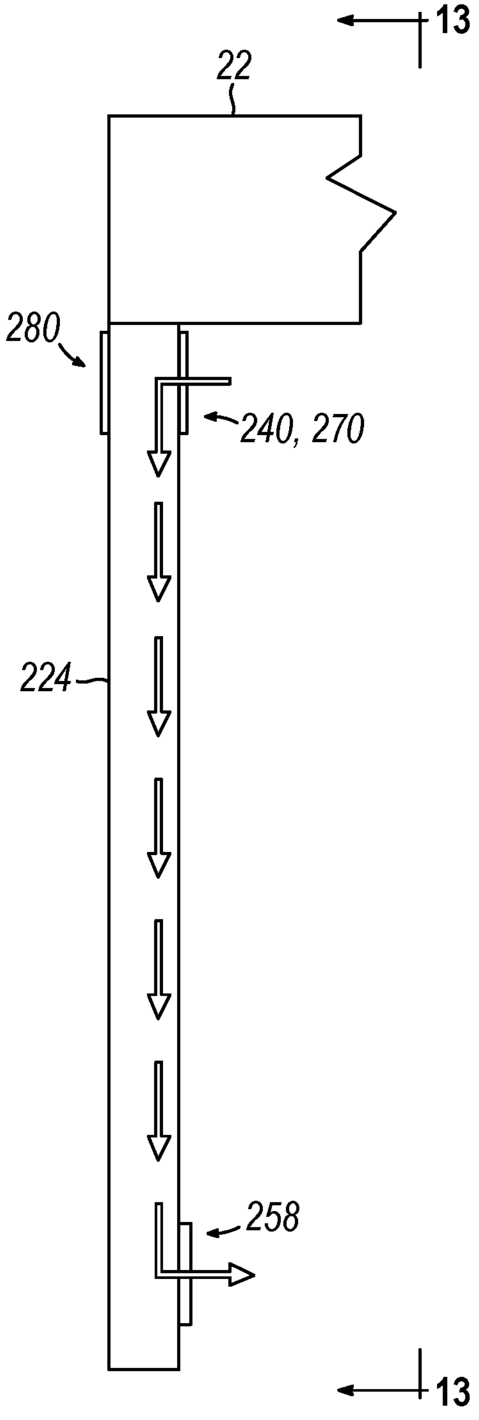
FIG. 12 depicts a partial elevational front view of an alternative side frame.
Figure 13:
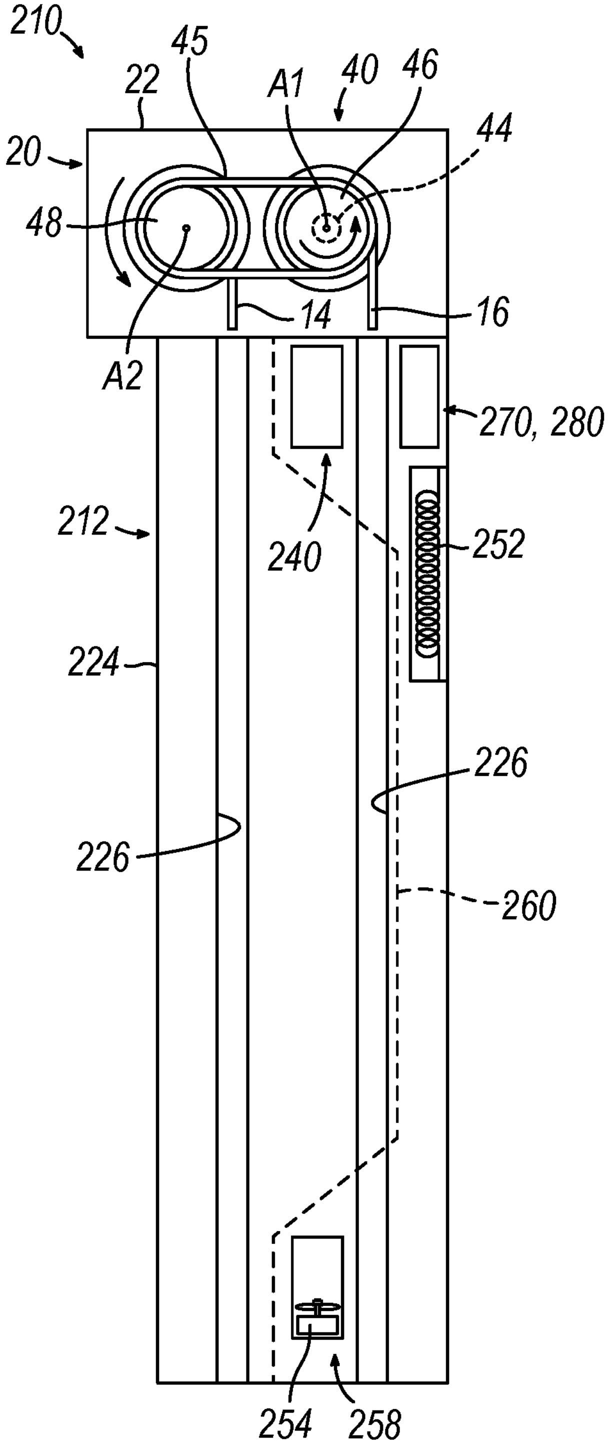
FIG. 13 depicts a cross-sectional side view of the side frame of FIG. 12, taken along line 13-13 of FIG. 12.

FIGS. 12-13 show an exemplary side frame (224) that may use heated air intended to circulate within interior volume (18) to sufficiently heat frame (224) in order to prevent unwanted condensation. Side frame (224) may be substantially similar to side frames (24, 124) described above, with differences elaborated below. Side frame (224) includes a pair of curtain tracks (226), an internal volume adjustable inlet assembly (240), a heating element (252), a circulation element (254), an outlet (258), a first outer volume adjustable inlet assembly (270), and a second outer volume adjustable inlet assembly (280); which are substantially similar to curtain tracks (126), internal volume adjustable inlet assembly (140), heating element (152), circulation element (154), outlet (158), first outer volume adjustable inlet assembly (170), a second outer volume adjustable inlet assembly (180) described above respectively, with differences elaborated below.

In particular, as best shown in FIG. 13, inlet assemblies (240, 270, 280) and heating element (252) are located near the top of side frame (224), while outlet (258) and circulation element (254) are located near the bottom of side frame (224). An internal duct (260) connecting heating element (252) to outlet (258) extends along the length of side frame (224). Therefore, during exemplary operation, heated air leaving heating element (252) travels along the vertical length of side frame (224) via duct (260) in order to exit outlet (258). The heated air traveling along duct (260) may also help heat side frame (224) above the dew point temperature in order inhibit condensation buildup. This may prevent the need of installing a resistance wire alongside frame (224), thereby simplifying the installation process.

While in the current example, circulation element (254) is located near the bottom of side frame (224), this is merely optional. Circulation element (254) may be located at any suitable location as would be apparent to one skilled in the art in view of the teachings herein.

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A roll-up door assembly, comprising: (a) a first curtain; (b) a second curtain; wherein the first curtain and the second curtain are configured to transition between a lowered position and a raised position, wherein the first curtain and the second curtain at least partially define an internal volume in the lowered position; and (c) a side frame, wherein the side frame comprises: (i) an elongated body defining a hollow interior, (ii) a pair of curtain tracks configured to guide the first curtain and the second curtain between the lowered position and the raised position, (iii) a heating assembly configured to circulate heated air into the internal volume, and (iv) an inlet assembly configured to provide fluid communication between the heating assembly and a lower temperature conditioned space such that the heating assembly circulates air from the lower temperature conditioned space into the internal volume.

Example 2

The roll-up door assembly of Example 1, wherein the elongated body further comprises a wall mounting surface and an inward surface, wherein the wall mounting surface is configured to attach to a wall, wherein the pair of curtain tracks and the inward surface at least partially define the internal volume.

Example 3

The roll-up door assembly of Example 2, wherein the inlet assembly further comprises a first adjustable inlet assembly and a second adjustable inlet assembly, wherein the first adjustable inlet assembly is disposed on a first portion of the elongated body extending between the wall mounting surface and an internal track of the pair of curtain tracks, wherein the second adjustable inlet assembly is located on a second portion of the elongated body extending between the wall mounting surface and an external track of the pair of curtain tracks.

Example 4

The roll-up door assembly of Example 3, wherein the first adjustable inlet assembly and the a second adjustable inlet assembly are both configured to transition between an open position and a closed position, wherein the respective first adjustable inlet assembly or second adjustable inlet assembly is in fluid communication with the heating assembly in the open position, wherein the respective first adjustable inlet assembly or second adjustable inlet assembly is not in fluid communication with the heating assembly in the closed position.

Example 5

The roll-up door assembly of Example 4, wherein the first adjustable inlet assembly comprises a first sliding cover.

Example 6

The roll-up door assembly of Example 5, wherein the second adjustable inlet assembly comprises a second sliding cover.

Example 7

The roll-up door assembly of any one or more of Examples 4 through 6, further comprising a third adjustable inlet assembly configured to transition between an open position and a closed position, wherein the third adjustable inlet assembly is located on the inward surface.

Example 8

The roll-up door assembly of Example 7, wherein the third adjustable inlet assembly is in fluid communication with the heating assembly in the open position, wherein the third adjustable inlet assembly is not in fluid communication with the heating assembly in the closed position.

Example 9

The roll-up door assembly of any one or more of Examples 1 through 8, further comprising a sensor located within the internal volume.

Example 10

The roll-up door assembly of Example 9, wherein the heating assembly is configured to adjust a thermal temperature in response to a signal generated by the sensor.

Example 11

The roll-up door assembly of any one or more of Examples 9 through 10, further comprising a damper positioned between the first adjustable inlet assembly and the heating assembly.

Example 12

The roll-up door assembly of Example 11, wherein the damper is configured to adjust a volumetric flow of fluid in response to a signal generated by the sensor.

Example 13

The roll-up door assembly of any one or more of Examples 9 through 12, wherein the first adjustable inlet assembly is configured to transition between the open position and the closed position in response to a signal generated by the sensor.

Example 14

The roll-up door assembly of any one or more of Examples 1 through 13, further comprising an actuation assembly configured to drive the curtain assembly between the raised position and the lowered position.

Example 15

The roll-up door assembly of Example 14, wherein the actuation assembly comprises a first drum coupled with a first curtain and a second drum coupled with the second curtain.

Example 16

The roll-up door assembly of Example 15, wherein the actuation assembly comprises a motor configured to rotate the first drum and the second drum.

Example 17

A roll-up door assembly, comprising: (a) a pair of curtains configured to transition between a lowered position and a raised position, wherein the pair of curtains at least partially define an internal volume in the lowered position; and (b) a side frame, wherein the side frame comprises: (i) an elongated body defining a hollow interior, (ii) a pair of curtain tracks configured to guide the pair of curtains between the lowered position and the raised position, (iii) a heating assembly configured to circulate heated air into the internal volume, and (iv) a sensor located within the internal volume, wherein the sensor is configured to generate a signal, wherein the heating assembly is configured to adjust a ratio of air originating from a lower temperature conditioned space and the internal volume in response to the signal generated by the sensor.

Example 18

The roll-up door assembly of Example 17, further comprising a control module assembly, wherein the heating assembly and the sensor are in communication with the control module assembly.

Example 19

A roll-up door assembly, comprising: (a) a pair of curtains configured to transition between a lowered position and a raised position, wherein the pair of curtains at least partially define an internal volume in the lowered position; and (b) a side frame, wherein the side frame comprises: (i) an elongated body defining a hollow interior, (ii) a pair of curtain tracks configured to guide the pair of curtains between the lowered position and the raised position, (iii) a heating assembly configured to circulate heated air into the internal volume, wherein the heating assembly is located adjacent to a top portion of the elongated body, (iv) an inlet in fluid communication with the heating assembly, wherein the inlet is located adjacent to the top portion of the elongated body, and (v) an outlet in fluid communication with the heating assembly and the hollow interior, wherein the outlet is located adjacent to a bottom portion of the elongated body.

Example 20

The roll-up door assembly of Example 19, further comprising a circulation element disposed between the outlet and the heating assembly.

VI. Miscellaneous

It should be understood that any of the versions of instruments described herein may include various other features in addition to or in lieu of those described above. By way of example only, any of the instruments described herein may also include one or more of the various features disclosed in any of the various references that are incorporated by reference herein. It should also be understood that the teachings herein may be readily applied to any of the instruments described in any of the other references cited herein, such that the teachings herein may be readily combined with the teachings of any of the references cited herein in numerous ways. Other types of instruments into which the teachings herein may be incorporated will be apparent to those of ordinary skill in the art.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A side frame of a roll-up door assembly, the side frame comprising:

(a) an elongated structure comprising:

(i) a wall mounting surface configured to be attached to a wall to thereby attach the side frame to the wall, (ii) a laterally inward surface, and (iii) a laterally outward surface, wherein the wall mounting surface, the laterally inward surface, and the laterally outward surface at least partially define a hollow interior;

(b) an interior curtain track extending vertically along the laterally inward surface, wherein the interior curtain track is configured to slidably receive a first curtain of the roll-up door assembly;

(c) an exterior curtain track extending vertically along the laterally inward surface, wherein the exterior curtain track is configured to slidably receive a second curtain of the roll-up door assembly, wherein the interior curtain track is interposed between the exterior curtain track and the wall mounting surface;

(d) an outlet interposed between the interior curtain track and the exterior curtain track, wherein the outlet is in fluid communication with the hollow interior;

(e) a first inlet interposed between the interior curtain track and the wall mounting surface, wherein the first inlet is configured to provide fluid communication between a low temperature space and the hollow interior via the outlet when the side frame extends from the wall into a high temperature space; and (f) a second inlet, wherein the second inlet is configured to provide fluid communication between the low temperature space and the hollow interior via the outlet when the side frame extends from the wall into the low temperature space.

2. The side frame of claim 1, further comprising an adjustable cover slidably attached to the elongated structure, wherein the adjustable cover is configured to transition between an open position and a closed position.

3. The side frame of claim 2, wherein the adjustable cover is slidably attached to the laterally inward surface of the elongated structure.

4. The side frame of claim 3, wherein the adjustable cover is configured to selectively inhibit fluid communication between an external environment directly adjacent to the first inlet and the hollow interior in the closed position.

5. The side frame of claim 4, wherein the adjustable cover is configured to allow fluid communication between the external environment directly adjacent to the first inlet and the hollow interior in the open position.

6. The side frame of claim 2, wherein the second inlet is located on the laterally outward surface of the elongated structure.

7. The side frame of claim 6, wherein the adjustable cover is slidably attached to the laterally outward surface of the elongated structure.

8. The side frame of claim 7, wherein the adjustable cover is configured to selectively inhibit fluid communication between an external environment directly adjacent to the second inlet and the hollow interior in the closed position.

9. The side frame of claim 8, wherein the adjustable cover is configured to allow fluid communication between the external environment directly adjacent to the second inlet and the hollow interior in the open position.

10. The side frame of claim 1, wherein the elongated structure further comprises an exterior surface connecting the laterally inward surface and the laterally outward surface.

11. The side frame of claim 10, wherein the exterior surface, laterally inward surface, laterally outward surface, and the wall mounting surface together form a rectangular shape defining the hollow interior.

12. A side frame of a roll-up door assembly, the side frame comprising:

(a) an elongated structure defining a hollow interior, wherein the elongated structure comprises:

(i) a wall mounting surface configured to be attached to a wall, wherein the wall mounting surface extends laterally between an interior end and an exterior end, (ii) a first lateral surface extending away from the interior end of the wall mounting surface, and (iii) a second lateral surface extending away from the exterior end of the wall mounting surface, (b) a first curtain track associated with the first lateral surface, wherein the first curtain track is configured to slidably receive a first curtain of the roll-up door assembly;

(c) a second curtain track associated with the first lateral surface, wherein the second curtain track is configured to slidably receive a second curtain of the roll-up door assembly, wherein the first curtain track is interposed between the second curtain track and the wall mounting surface;

(d) an outlet located on the first lateral surface and interposed between the first curtain track and the second curtain track;

(e) a first inlet located on the first lateral surface and interposed between the first curtain track and the wall mounting surface, wherein the first inlet is configured to provide fluid communication between a first external environment directly adjacent to the first inlet and the hollow interior when the side frame extends from the wall into a high temperature space;

(f) a first damper configured to control fluid communication between the first external environment and the first inlet;

(g) a second inlet, wherein the second inlet is configured to provide fluid communication between a second external environment located directly adjacent to the second inlet and the hollow interior when the side frame extends from the wall into a low temperature space; and (h) a second damper configured to control fluid communication between the second external environment and the second inlet.

13. The side frame of claim 12, wherein the second inlet is located on the second lateral surface.

14. The side frame of claim 12, wherein the elongated structure comprises a body forming the wall mounting surface, the first lateral surface, and the second lateral surface.

15. The side frame of claim 12, wherein the first curtain track and the second curtain track extend vertically along the first lateral surface.

16. A door assembly interposed between a high temperature space and a lower temperature space, the door assembly comprising:

(a) a first curtain;

(b) a second curtain, wherein the first curtain and the second curtain at least partially define an internal volume in a lowered position; and (c) a side frame, wherein the side frame comprises:

(i) an elongated body defining a hollow interior, (ii) a heater configured to circulate heated air into the internal volume, and (iii) at least one inlet assembly configured to provide fluid communication between the heater and the low temperature space such that the heater circulates air from the low temperature space into the internal volume.

17. The door assembly of claim 16, wherein the first curtain and the second curtain are slidably attached to the side frame between the lowered position and a raised position.

18. The door assembly of claim 17, further comprising a motor configured to selectively actuate the first curtain and the second curtain between the lowered position and the raised position.

19. The door assembly of claim 16, wherein the side frame comprises a first curtain track and a second curtain track.

20. The door assembly of claim 16, wherein the side frame defines a portion of the hollow interior.

* * * * *